United States Patent
Debates et al.

(10) Patent No.: US 10,498,380 B2
(45) Date of Patent: Dec. 3, 2019

(54) DETERMINING SPATIAL RELATIONSHIPS BETWEEN HOUSINGS OF A MOBILE DEVICE

(71) Applicant: Motorola Mobility LLC, Chicago, IL (US)

(72) Inventors: Scott Debates, Crystal Lake, IL (US); Douglas A Lautner, Round Lake, IL (US); Jagatkumar Shah, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 34 days.

(21) Appl. No.: 15/059,353

(22) Filed: Mar. 3, 2016

(65) Prior Publication Data
US 2017/0257131 A1    Sep. 7, 2017

(51) Int. Cl.
*H04B 1/3888* (2015.01)
*G06F 1/16* (2006.01)
*H04B 1/3827* (2015.01)

(52) U.S. Cl.
CPC ......... *H04B 1/3888* (2013.01); *G06F 1/1652* (2013.01); *G06F 1/1677* (2013.01); *H04B 1/3833* (2013.01)

(58) Field of Classification Search
CPC .... G06F 3/1423; G06F 1/1616; G06F 1/1641; G06F 1/1647; G06F 1/1681; G06F 3/0412; H04M 1/0216; H04M 1/0206; H04M 1/0214; H04M 1/0266
See application file for complete search history.

(56) References Cited

U.S. PATENT DOCUMENTS

| | | | | |
|---|---|---|---|---|
| 8,996,073 | B2* | 3/2015 | Sirpal | G06F 3/1438 455/566 |
| 10,289,258 | B2* | 5/2019 | Lee | G06F 3/048 |
| 10,317,947 | B2* | 6/2019 | Park | G06F 1/1652 |
| 2010/0117975 | A1* | 5/2010 | Cho | G06F 1/1626 345/173 |
| 2010/0321275 | A1* | 12/2010 | Hinckley | G06F 1/1618 345/1.3 |
| 2011/0115713 | A1* | 5/2011 | Altman | G06F 1/1616 345/169 |
| 2014/0055429 | A1* | 2/2014 | Kwon | G09G 3/001 345/204 |
| 2015/0227173 | A1* | 8/2015 | Hwang | G06F 1/1652 345/619 |
| 2016/0085319 | A1* | 3/2016 | Kim | G06F 3/0346 345/156 |
| 2016/0179236 | A1* | 6/2016 | Shin | G06F 1/1616 |

FOREIGN PATENT DOCUMENTS

| | | |
|---|---|---|
| CN | 101674361 | 3/2010 |
| CN | 102411402 | 4/2012 |
| CN | 103294113 | 9/2013 |

OTHER PUBLICATIONS

"Foreign Office Action", CN Application No. 201710123820.3, dated Jul. 10, 2019, 28 pages.

* cited by examiner

*Primary Examiner* — Liton Miah
(74) *Attorney, Agent, or Firm* — SBMC

(57) ABSTRACT

In implementations, a mobile device having a plurality of housings connected, one to another, using a flex structure that is bendable, is configured to determine spatial relationships between the housings. Sensors within the mobile device allow the mobile device to determine the spatial relationships as the mobile device is manipulated via the flex structure.

20 Claims, 8 Drawing Sheets

DETERMINING SPATIAL RELATIONSHIPS BETWEEN HOUSINGS OF A MOBILE DEVICE

BACKGROUND

The ever increasing popularity of mobile devices is well known. To drive this popularity, the functionality incorporated as part of the mobile devices continues to expand. One example of this is incorporation of a flexible display device that allow a user to bend the display device and even a housing of the mobile device to assume a variety of different viewing modes.

Conventional techniques used to determine which viewing mode is currently assumed by the mobile device involve use of dedicated hardware, such as switches or binary sensors. Accordingly, addition of this dedicated hardware increases the cost of the mobile device. Further, conventional hardware is typically limited to identification of a limited number of viewing modes and cannot address the different viewing modes made available by flexible display devices and housings.

BRIEF DESCRIPTION OF THE DRAWINGS

Implementations of determining spatial relationships between housings of a mobile device are described with reference to the following drawings. The same numbers are used throughout the drawings to reference like features and components.

DETAILED DESCRIPTION

Figure 1:
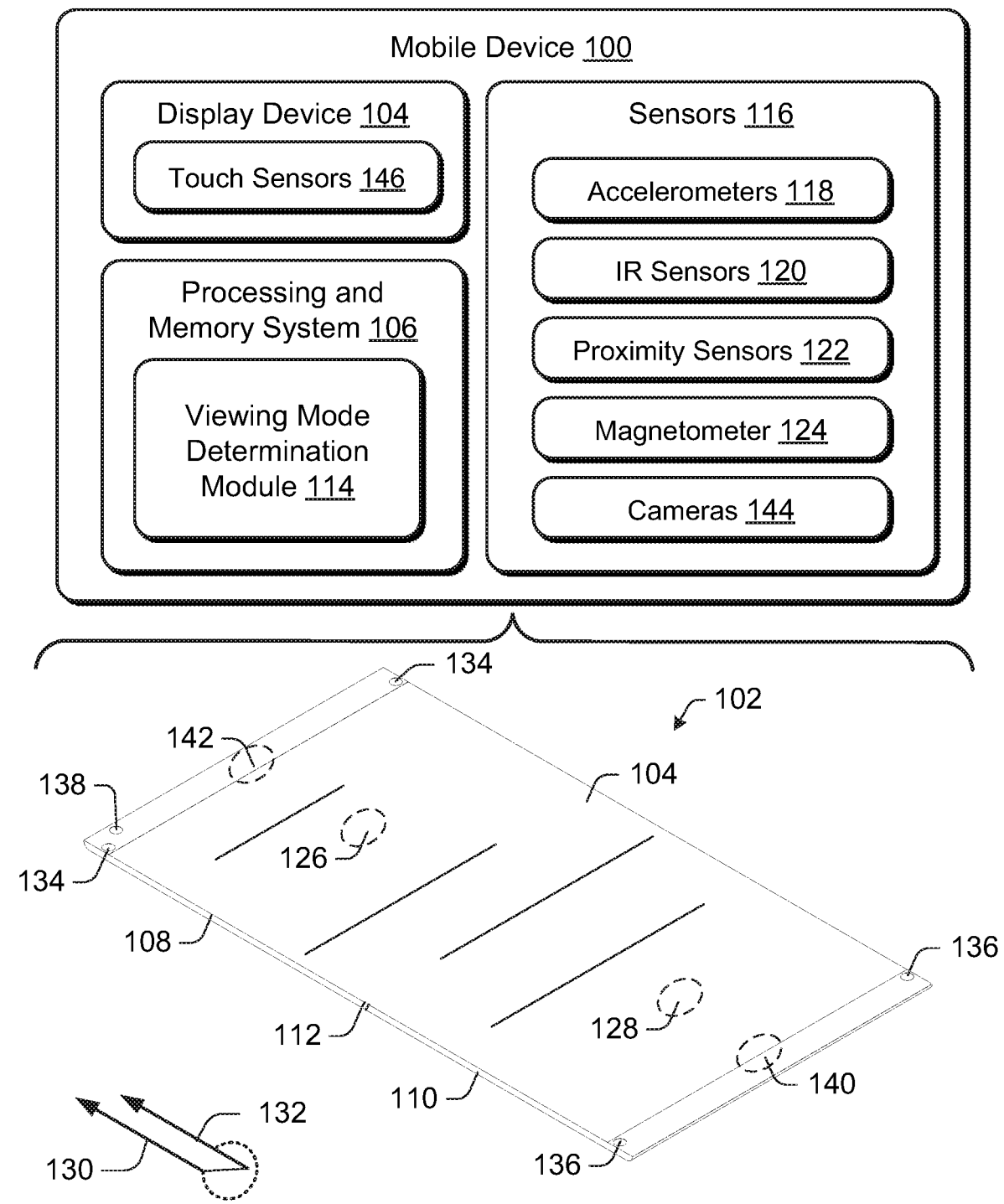
FIG. 1 illustrates various components of a mobile device and the mobile device in an open viewing mode including some of the sensors that may be used to determine various viewing modes of the mobile device in accordance with one or more implementations.

Conventional techniques used to detect a viewing mode of a device involve the use of switches or other binary devices. Although these techniques may work well for a device with a limited number of positions, such as open or closed, a flexible device enables a user to manipulate the device into a variety of viewing modes that are difficult if not impossible to detect using standard binary devices or switches. Further, these conventional techniques involve addition of dedicated hardware which may cause an increase in cost of the device, further complicate a design of the device, and so forth Accordingly, a robust and accurate way is described to determine multiple viewing modes of a flexible mobile device. Sensors are used to precisely determine a plurality of viewing modes involving various distinct relationships between housings of the device as these housings are manipulated into different positions. The sensors may also support verification of a determined viewing mode, one to another, and thus support redundancy in an initial determination.

Any number of sensors and types of sensors may be used to determine an orientation of one housing of a plurality of housings of the device, one to another. In one example, accelerometers are used to determine relative angles between various housings of the device. In another example, infrared (IR) sensors are used to determine relative proximity of one housing to another. Similarly, proximity sensors or light sensors may also be used to determine proximity of one housing to another.

In a further example, a magnetometer within one housing is used to measure a relative feedback from a reference point in another housing to determine a relative distance between the sensor and the reference point.

The sensors described above are usable to determine a viewing mode of the device from the determination of the orientation of one housing in relation to another. Examples of viewing modes include an open viewing mode such that a display of the device is completely exposed similar to a tablet, a closed viewing mode such the device is folded in half completely occluding the display similar to a closed laptop, a dock viewing mode such that the device is folded such that one housing is approximately 90 degrees apart from another housing similar to an open laptop, a glance viewing mode similar to the closed mode except where a portion of the display is exposed, and a productive viewing mode wherein the device is folded such that approximately half of the display is exposed.

The device may respond in a variety of different ways once a viewing mode is determined. For example, the device may enable functionality specific to the viewing mode by enabling, disabling, or changing a display mode of one or more display devices, configuration of which functionality is made available to a user (e.g., shutting off a keyboard, a secondary input device, ports, enabling or disabling any number of functionalities specific to the viewing mode), and so forth. When the device is manipulated into a different viewing mode, the device is able to determine the new viewing mode and change any functionality corresponding to the new viewing mode as further described in the following.

While features and concepts of determining spatial relationships between housings of a mobile device can be implemented in any number of different environments, systems, devices, and/or various modes, implementations of monitoring a mobile device mode are described in the context of the following example devices, systems, and configurations.

Example Environment

FIG. 1 illustrates an example of a mobile device 100. The mobile device 100 may assume a variety of configurations.

One example of which is a mobile phone or tablet in which the open viewing mode 102 causes the mobile device 100 to mimic a slate configuration in order to make the display device 104 viewable to a user of the device. Other examples are also contemplated, including use of the open viewing mode 102 when the mobile device 100 is configured as a "wearable", such as to be worn on a wrist of a user, as a pendant, as glasses, goggles, and so forth.

The mobile device 100 includes a processing and memory system 106 that is representative of functionality to execute instructions, such as to cause output of a user interface on the display device 104. The processing and memory system 106 may be implemented in a variety of ways, including as dedicated integrated circuits, fixed hardware, and so forth as further described in relation to FIG. 8. The mobile device 100 is configured to include a plurality of housings, examples of which include a first housing 108 and a second housing 110 that are joined using a flex structure 112, e.g., as a flexible hinge. The flex structure 112 is configured to support positioning of the first and second housings 108, 110 in a variety of different orientations to support a variety of viewing modes. The first and second housings 108, 110 may be configured in a variety of ways, such as fixed structures (e.g., formed out of a metal and/or plastic) that are not flexible and instead rely on the flex structure 112 as a separate device to both join the housings and enable the different viewing modes. In another example, the flex structure 112 is incorporated as part of the first and second housings 108, 110 such that the housings are flexible along a plurality of points as further described below, e.g., orthogonal to a longitudinal axis of the display device 104. Although the device is described with two housings, any number of housings can be implemented and connected via the flex structure 112 or a plurality of such structures without departing from the scope of the description contained herein, such as multiple links in a wearable wrist band.

The display device 104 in the illustrated example is disposed over both the first and second housings 108, 110 and the flex structure 112. Other examples are also contemplated, such as separate display devices employed on each of the plurality of housings. The display device 104 is also configured in this example to bend in in any number of locations and is connected to the plurality of housings of the device 110, e.g., as a flexible OLED screen. The display device 104 may also incorporate a touchscreen or touch sensitive functionality through incorporation of touch sensors 146.

The mobile device 100 also includes a viewing mode determination module 114 that is implemented at least partially in hardware, e.g., through use of the processing and memory system 106. The viewing mode determination module 114 is representative of logic implemented via the hardware to determine a viewing mode based on a detected orientation and disposition of the plurality of housings (e.g., the first and second housings 108, 110) in relation to each other.

In order to determine the viewing mode, the viewing mode determination module 114 leverages signals received from sensors 116 of the mobile device 110 that are incorporated as part of the first and second housings 108, 110. Signals received from the sensors 116, for instance, may be compared to determine an orientation and likely positioning of the housings in space and from this a likely viewing mode. The viewing mode determination module 114 may also include functionality to verify signals received from one of the sensors 116 using another one of the sensors 116 as further described in the following.

Examples of sensors 116 include accelerometers 118, infrared (IR) sensors 120, proximity sensors 122, and magnetometers 124 although other examples are also contemplated, such as to leverage forward or rear facing cameras 144 of the mobile device 100 or touch sensors 146 of the display device 104. These sensors 116 may be used in a variety of different ways by the viewing mode determination module 114 to address particular functionality of the sensors to determine a spatial relationship and orientation of the housings.

The accelerometers 118, for instance, may include a first and second accelerometer 126, 128 that are disposed at opposing ends of a structure formed by the plurality of housings, e.g., at opposing ends of the first and second housings 108, 110. To calculate a relative angle between the first housing 108 and the second housing 110, inputs from the first accelerometer 126 and the second accelerometer 128 are compared. The relative angle is based on differences in readings of the two accelerometers (e.g., an axis detected by each of the sensors) to determine the relative angle between the first housing 108 and the second housing 110. In an implementation, the same axis of each of the two accelerometers is positioned such that the axis for the first accelerometer 126 and the second accelerometer 128 read positive towards the "top" of the device in the open viewing mode 102, e.g., point up toward the display device 104. For the following discussion, a first accelerometer x-axis is referred to as a "first x-axis" 130 and a second accelerometer x-axis is referred to as a "second x-axis" 132, and used as reference axes for the angle determination between the first housing 108 and the second housing 110 for reasons of consistency between the various viewing modes. Any other configuration of the two accelerometers may be utilized without departing from the scope of the follows disclosure. While the device is in the open viewing mode 102, the first x-axis 130 and the second x-axis 132 of the first and second accelerometers 126, 128 read a relative angle of approximately zero degrees.

Other sensors may also be employed by the viewing mode determination module 114 to further determine the open viewing mode 102 or verify the determined open viewing mode 102. The IR sensors 120, for instance, may include individual or pairs of first and second IR sensors 134, 136 that are disposed at opposing ends of the structure formed by the plurality of housings, e.g., at opposing ends of the first and second housings 108, 110. While the device is in the open viewing mode 102, the first and second IR sensors 134, 136 read minimum values because the first and second housings 108, 110 are not occluding the IR sensors 134, 136.

The proximity sensors 122 may also be used to determine a likelihood that the mobile device 100 is oriented in the illustrated open viewing mode. In this example, the illustrated open viewing mode 102 includes a proximity sensor 138 disposed at an end of the structure formed by the plurality of housings, e.g., at one end of the first housing 108. The proximity sensor 138 may also comprise a light sensor that is able to detect proximity of an object, e.g., the second housing 110. While the device is in the open viewing mode 102, the proximity sensor 122 reads a minimum value because the first and second housings 108, 110 do not occlude the proximity sensor 38.

In another example, the magnetometer 124 is implemented in the open viewing mode 102 as a magnetometer 140 disposed at an end of the structure formed by the plurality of housings, e.g., at one end of the second housing 110. The magnetometer 140 may determine an amount of feedback coming from a magnetometer reference 142 disposed at an end of the structure formed by the plurality of housings, e.g., at one end of the first housing 108. The magnetometer reference 142 may be a screw or any other piece of metal that can be used as a reference point for detection by the magnetometer 140. The magnetometer 140 may measure Teslas, and for example, may read a higher level of Teslas if the second housing 110 is folded towards or placed closer to the first housing 108 due to a decreased distance between the magnetometer 124 and the magnetometer reference 142. On the other hand, while the device is in the open viewing mode 102, the magnetometer 140 reads a minimum value due to the magnetometer reference 142 being at a farthest point from the magnetometer 140 compared with other viewing modes.

Figure 2:
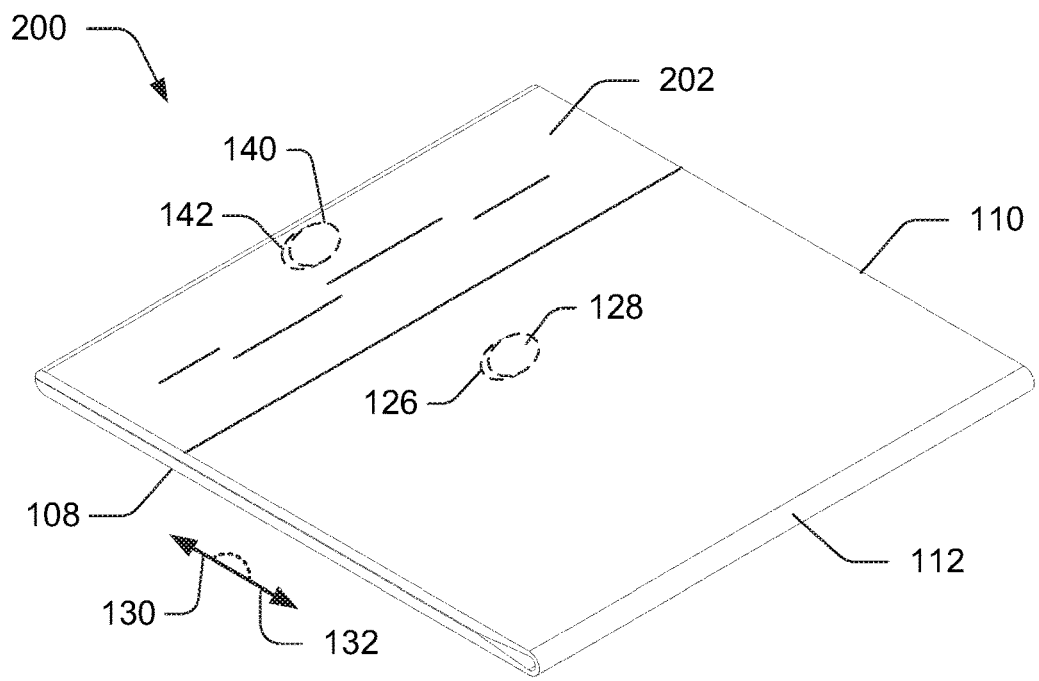
FIG. 2 illustrates an example of the mobile device in a closed viewing mode in accordance with one or more implementations.

FIG. 2 illustrates an example of the mobile device 100 as described with respect to FIG. 1 in a closed viewing mode 200. This viewing mode causes the mobile device 100 to mimic a closed laptop computer in order to conceal the display device 104 from a user of the device and/or to protect the display device 104 for transport. Also, shown in FIG. 2 is a second input device 202 that is disposed on a side of the mobile device 100 opposite the display device 104 in the second housing 110. The second input device 202 may include a keyboard or other fixed layout input device for input commands or comprise a second display device. The second display device may also include touch functionality to operate as a touch sensitive device, e.g., through use of capacitive sensors. Although the second input device 202 may be used to show notifications and/or provide inputs to the device in the closed viewing mode 200, the second input device 202 may have other more apparent functions when the mobile device 100 is configured into other viewing modes shown in FIGS. 4 and 5.

To calculate a relative angle between the first housing 108 and the second housing 110 for the closed viewing mode 200, inputs from the first accelerometer 126 and the second accelerometer 128 are compared. While the device is in the closed viewing mode 200, the first x-axis 130 and the second x-axis 132 read a relative angle of approximately 180 degrees.

Other sensors may also be employed by the viewing mode determination module 114 to further determine the closed viewing mode 200 or verify the determined closed viewing mode 200. While the device is in the closed viewing mode 200, the first and second IR sensors 134, 136 read maximum values because the first and second housings 108, 110 occlude the first and second of IR sensors 134, 136. In one example, the proximity sensor 138 reads a maximum value because the second housing 110 occludes the proximity sensor 138 while in this closed viewing mode. In another example, the magnetometer 140 reads a maximum value due to the magnetometer reference 142 being at a closest point from the magnetometer 140 compared with other viewing modes. In this way, the sensors and combinations of the sensors may be used to both detect the closed viewing mode 200 as well as to verify the closed viewing mode 200, e.g., through comparison of sensor outputs.

Figure 3:
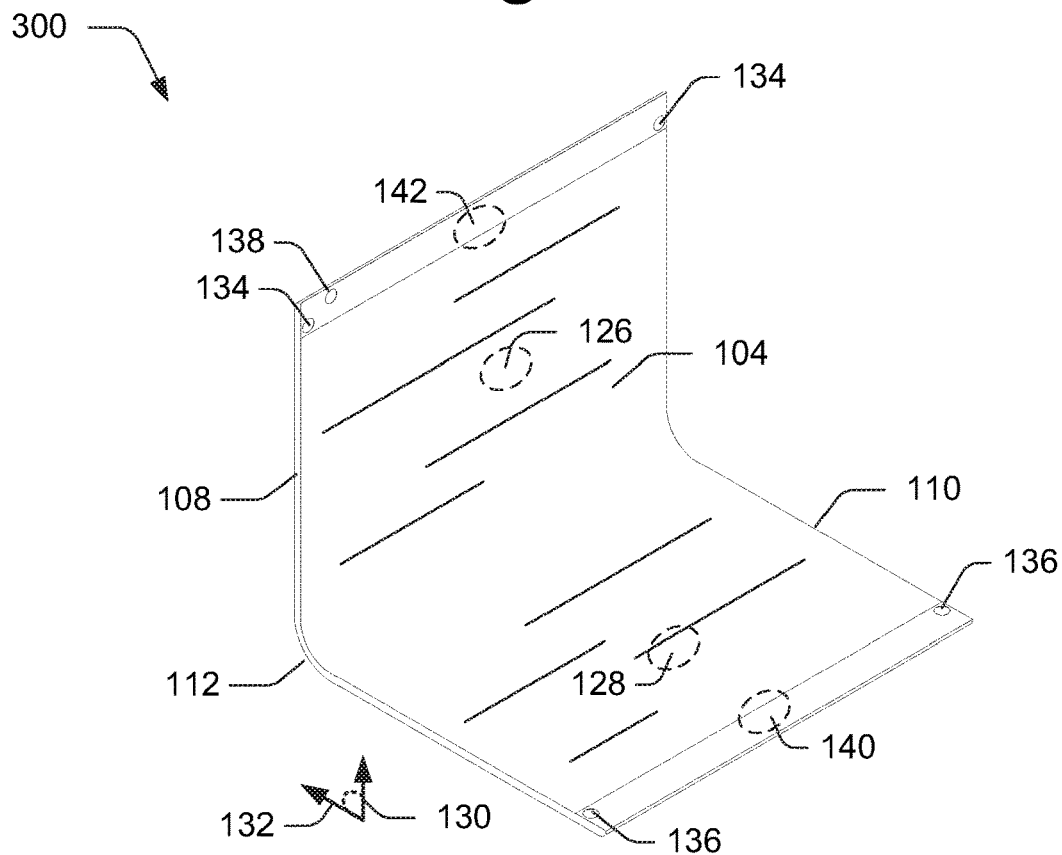
FIG. 3 illustrates an example of the mobile device in a dock viewing mode in accordance with one or more implementations.

FIG. 3 illustrates an example of the mobile device 100 as described with respect to FIG. 1 in a dock viewing mode 300 that causes the mobile device 100 to mimic an open laptop computer. In the dock viewing mode 300, the display device 104 is revealed to a user of the device and also enables input through a portion of the display device 104 corresponding to the second housing 110.

To calculate a relative angle between the first housing 108 and the second housing 110 for the dock viewing mode 300, inputs from the first accelerometer 126 and the second accelerometer 128 are compared. While the device is in the dock viewing mode 300, the first x-axis 130 and the second x-axis 132 read a relative angle of approximately 90 degrees.

As before, other sensors may also be employed by the viewing mode determination module 114 to further determine the dock viewing mode 300 or verify the determined dock viewing mode 300. While the device is in the dock viewing mode 300, the first and second IR sensors 134, 136 both read minimum values because the first and second housings 108, 110 do not occlude the first and second IR sensors 134, 136. In another example, the proximity sensor 138 reads a minimum value because the first and second housings 108, 110 do not occlude the proximity sensor 138 while in this mode. Further, while in the dock viewing mode 300, the magnetometer 140 reads a value higher than when the device 100 is in the open viewing mode 102 but lower than when the device is in the closed viewing mode 200 due to the magnetometer reference 142 being at an approximate middle distance from the magnetometer 140 compared with the open and closed viewing modes 102, 200.

Figure 4:
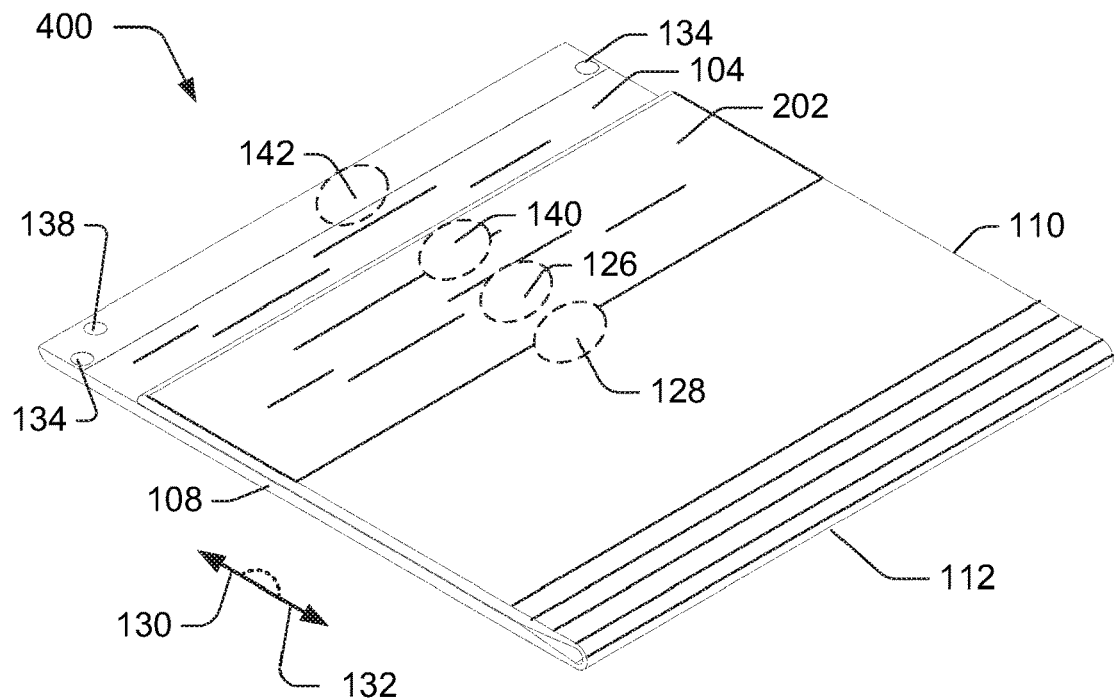
FIG. 4 illustrates an example of the mobile device in a glance viewing mode in accordance with one or more implementations.

FIG. 4 illustrates an example of the mobile device 100 as described with respect to FIG. 1 in a glance viewing mode 400. In the glance viewing mode 400 the mobile device 100 mimics the closed viewing mode 200 except that a portion of the display device 104 is exposed to a user. Also, shown in the glance viewing mode 400 is the second input device 202. In the glance viewing mode 400 the second input device 202 may be used to respond to notifications shown in the exposed portion of the display device 104, enable certain display functions on the exposed portion of the display device 104, or enable other functionality associated with the glance viewing mode 400. For example, if a keyboard were displayed or implemented within the second input device 202, a user may be able to respond to an email or text that is displayed in the exposed portion of the display device 104 in the glance viewing mode 400.

To calculate a relative angle between the first housing 108 and the second housing 110 for the glance viewing mode 400, inputs from the first accelerometer 126 and the second accelerometer 128 are compared. While the device is in the glance viewing mode 400, the first x-axis 130 and the second x-axis 132 read a relative angle of approximately 180 degrees similar to the closed viewing mode 200.

As before, other sensors may also be employed by the viewing mode determination module 114 to further distinguish the glance viewing mode 400 from the closed viewing mode 200 or verify the determined glance viewing mode 400. For example, while the device is in the glance viewing mode 400 the first IR sensors 134 read minimum values because the second housing 110 does not occlude the first pair of IR sensors 134. The second pair of IR sensors 136 read maximum values because the first housing 108 occludes the second IR sensors 136. While in this mode, the proximity sensor 138 reads a minimum value because the second housing 110 does not occlude the proximity sensor 138. Additionally, while the device 100 is in the glance viewing mode 400, the magnetometer 140 reads a value slightly less than when the device 100 is in the closed viewing mode 200 but more than when in the dock viewing mode 300 due to the magnetometer reference 142 being a distance farther from the magnetometer 140 than in the dock viewing mode 300 corresponding to the exposed portion of the display device 104.

Figure 5:
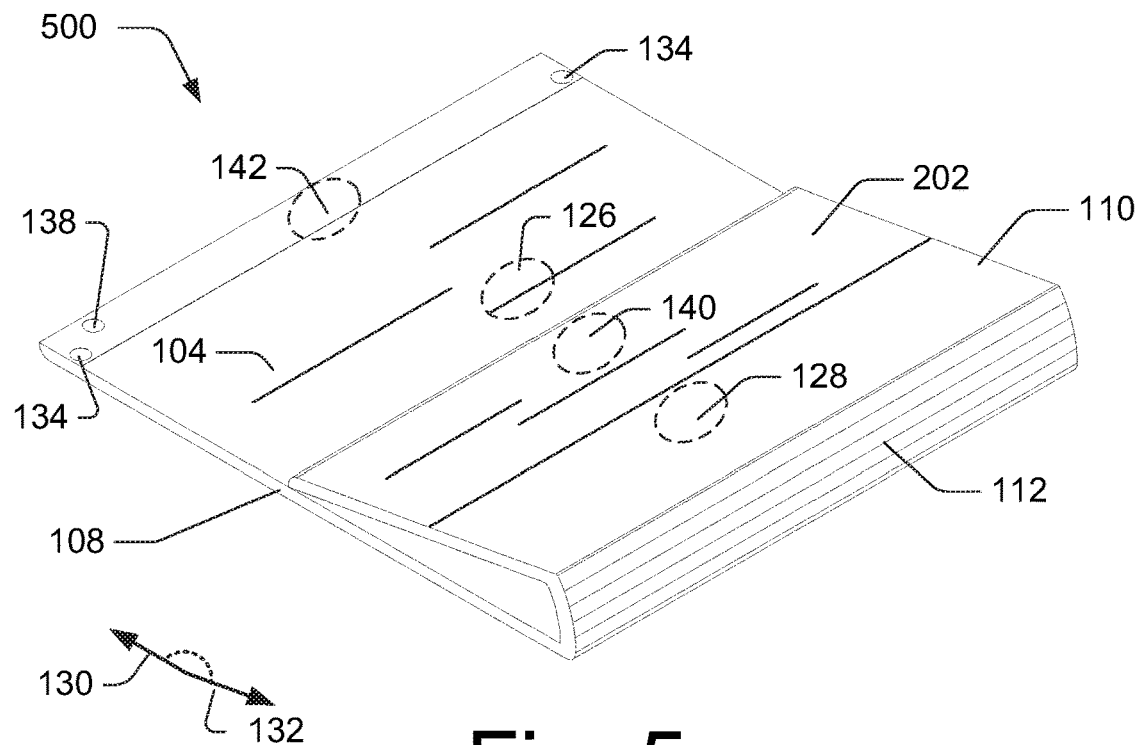
FIG. 5 illustrates an example of the mobile device in a productive viewing mode in accordance with one or more implementations.

FIG. 5 illustrates an example of the mobile device 100 as described with respect to FIG. 1 in a productive viewing mode 500 that causes the mobile device 100 to reveal approximately half of the display device 104 to a user of the device and also enable input through the exposed second input device 202. As discussed above, the second input device 202 may utilize a keyboard to enter text responsive to what is displayed in the exposed portion of the display device 104. Other useful input techniques include audio mixing tools, drawing tools, options, and so forth may also be integrated with the second input device 202 in order to interact with what is displayed on the exposed portion of the display device 104.

To calculate a relative angle between the first housing 108 and the second housing 110 for the productive viewing mode 500, inputs from the first accelerometer 126 and the second accelerometer 128 are compared. While the device is in the productive viewing mode 500, the first x-axis 130 and the second x-axis 132 read either 180 degrees apart if the flex structure 112 allows the second housing 110 to be flush with the first housing 108 in the productive viewing mode or an acute angle (shown in FIG. 3) if the second housing 110 is angled up and away from the first housing 108 due to restrictions of the flex structure 112.

Again, other sensors may also be employed by the viewing mode determination module 114 to further determine the productive viewing mode 500 or verify the determined productive viewing mode 500. While the device is in the productive viewing mode 500, the first IR sensors 134 read minimum values because the second housing 110 does not occlude the first IR sensors 134. The second IR sensors 136 read high values because the first housing 108 mostly occludes the second IR sensors 136. The acute relative angle between the first and second housings 108, 110 may cause the second IR sensors 136 to read slightly less than in the closed and glance viewing modes 200, 400. In this mode, the proximity sensor 138 reads a minimum value because the second housing 110 does not occlude the proximity sensor 138. Additionally, the magnetometer 140 reads a value greater than when the device 100 is in the dock viewing mode 300 but lower than when the device 100 is in the glance viewing mode 400 due to the magnetometer reference 142 being a distance farther from the magnetometer 140 than in the glance viewing mode 400 corresponding to a larger exposed portion (approximately one-half) of the display device 104.

While the device is in the productive viewing mode 500, the viewing mode determination module 114 may also utilize signals from the display device 104 to determine the productive viewing mode 500 or verify the productive viewing mode 500 determination. For example, touch sensors 146 within the display device 104 may determine where a leading edge of the second housing 110 contacts a portion of the display device 104 corresponding to the first housing 108. This may further establish the productive viewing mode 500 but may also establish an exact amount of exposed display device 104 as well. Establishing an amount of exposed display device 104 may help to optimize what information is displayed in the exposed display device 104.

Although the mobile device 100 has been shown and described with reference to five viewing modes (open, closed, dock, glance, and productive) any number of viewing modes can be determined by the sensors described herein without departing from the scope of the disclosure. Any bending of the mobile device 100 registers on one or more of the sensors and may be utilized to create any number of display and user interface modes.

Example System

Figure 6:
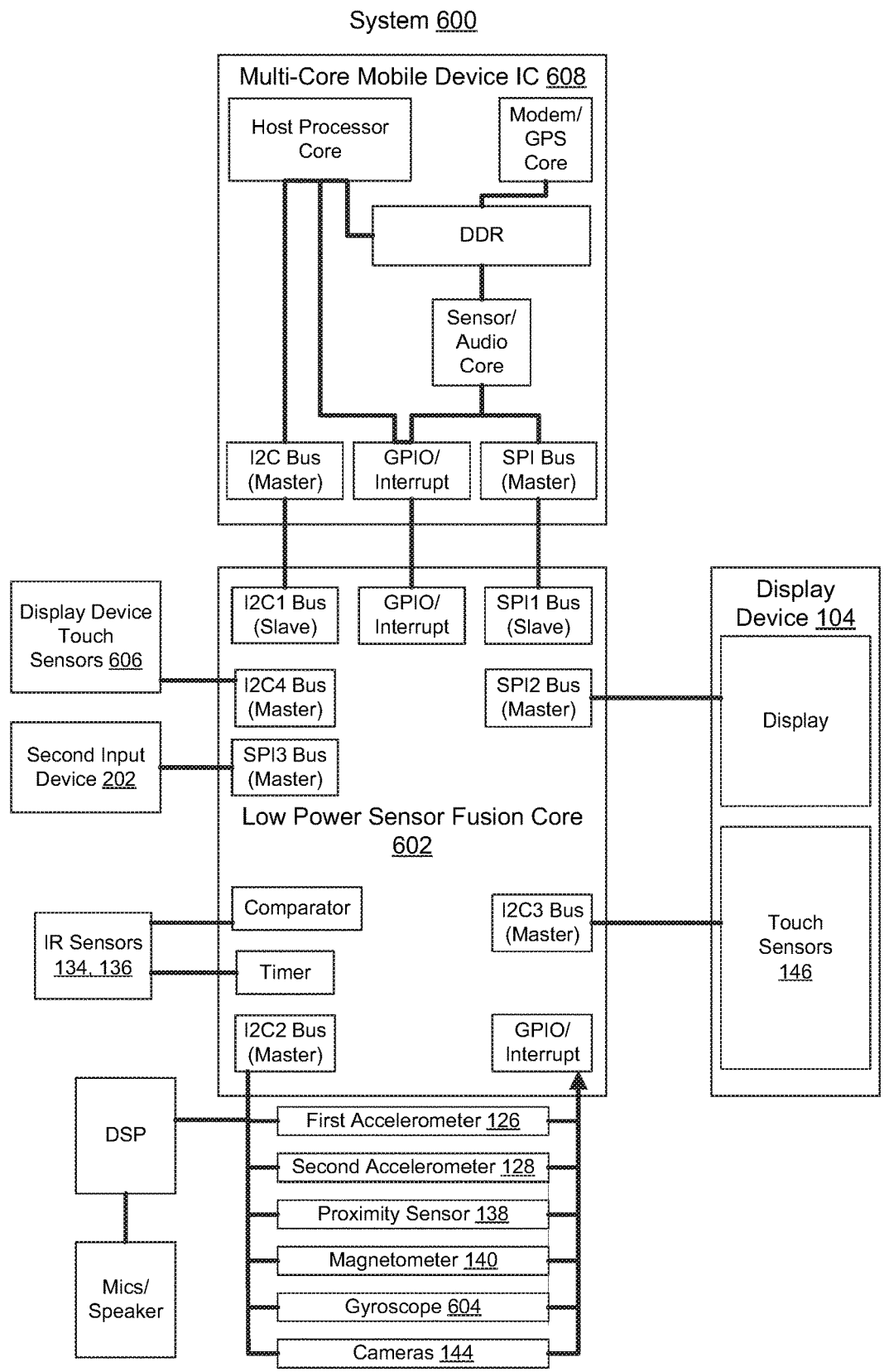
FIG. 6 illustrates a system for determining spatial relationships between housings of a mobile device in accordance with one or more implementations.

FIG. 6 illustrates various components of an example system 600 implemented as any type of mobile computing and/or communication device, wearable device, a portable device, electronic device, appliance device, media device, consumer device, gaming device, and/or the mobile computer device as described with reference to FIG. 1 for implementations of determining spatial relationships between housings of a mobile device. The system 600 has a low power sensor fusion core 602 that is responsible for providing inputs for the viewing mode determination module 114.

The low power sensor fusion core 602 enables the viewing mode determination module 114 to function with minimal power drain from the device 100. Example inputs to the low power sensor fusion core 602 are the sensors 116, specifically the first accelerometer 126, the second accelerometer 128, the first IR sensors 134, the second IR sensors 136, the proximity sensor 138, and the magnetometer 140 with reference to FIG. 1. Other inputs to the low power sensor fusion core 602 may be a gyroscope 604 as shown proximal to the other sensors of FIG. 1, the second input device 202 discussed with reference to FIGS. 2 and 3, and/or the touch sensors 146 of the display device 104 discussed with reference to FIG. 5. All of the above inputs may be utilized by the viewing mode determination module 114 to determine a viewing mode of the device.

The viewing mode determination module may be integrated within a multi-core mobile device IC 608 or be integrated within the low power sensor fusion core 602. Regardless, the low power sensor fusion core 602 communicates with the multi-core mobile device IC 608 to establish functionality of the device responsive to different viewing modes.

Example Procedures

Figure 7:
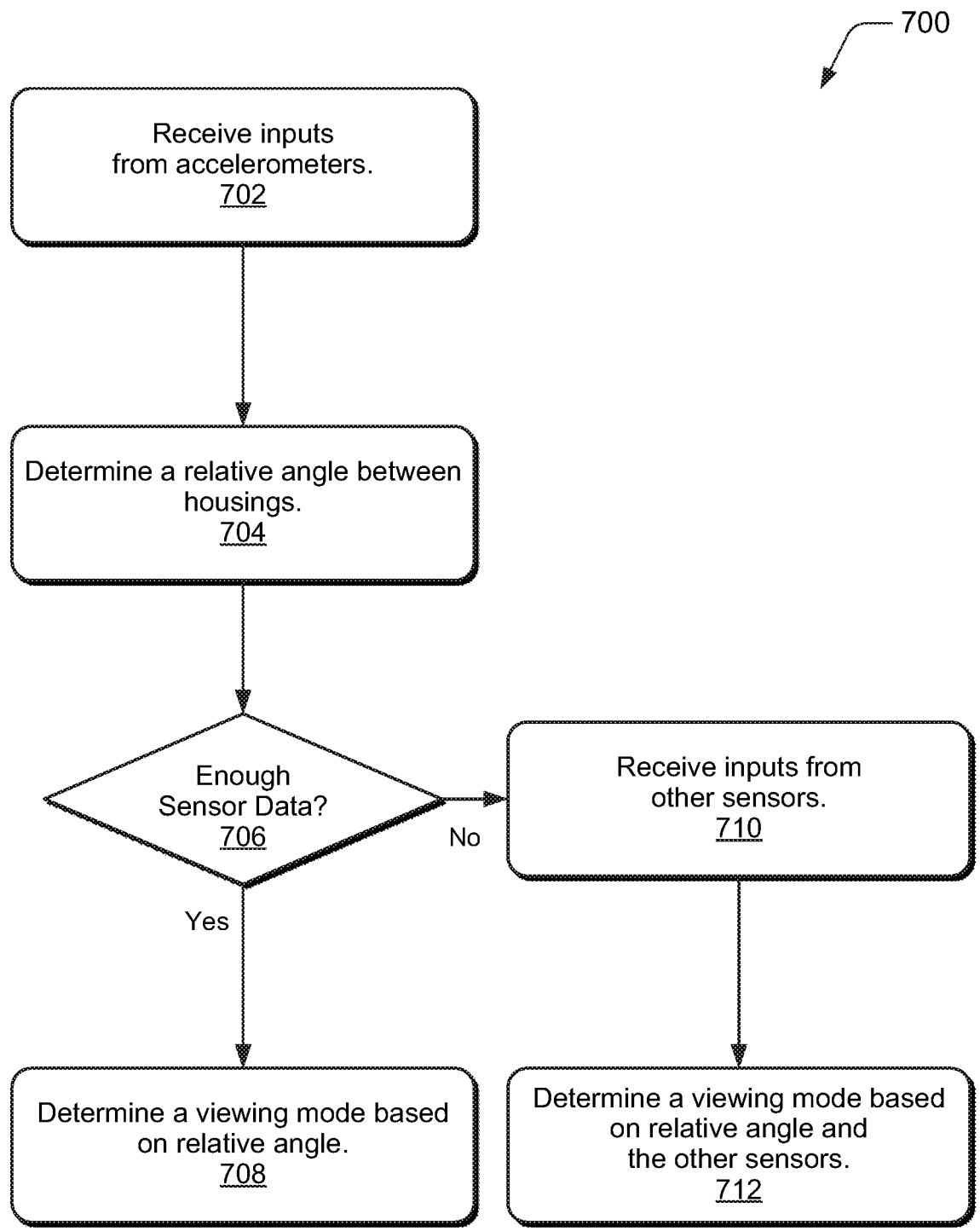
FIG. 7 illustrates a method of determining a viewing mode of the mobile device using accelerometers and other sensors in accordance with one or more implementations.
Figure 8:
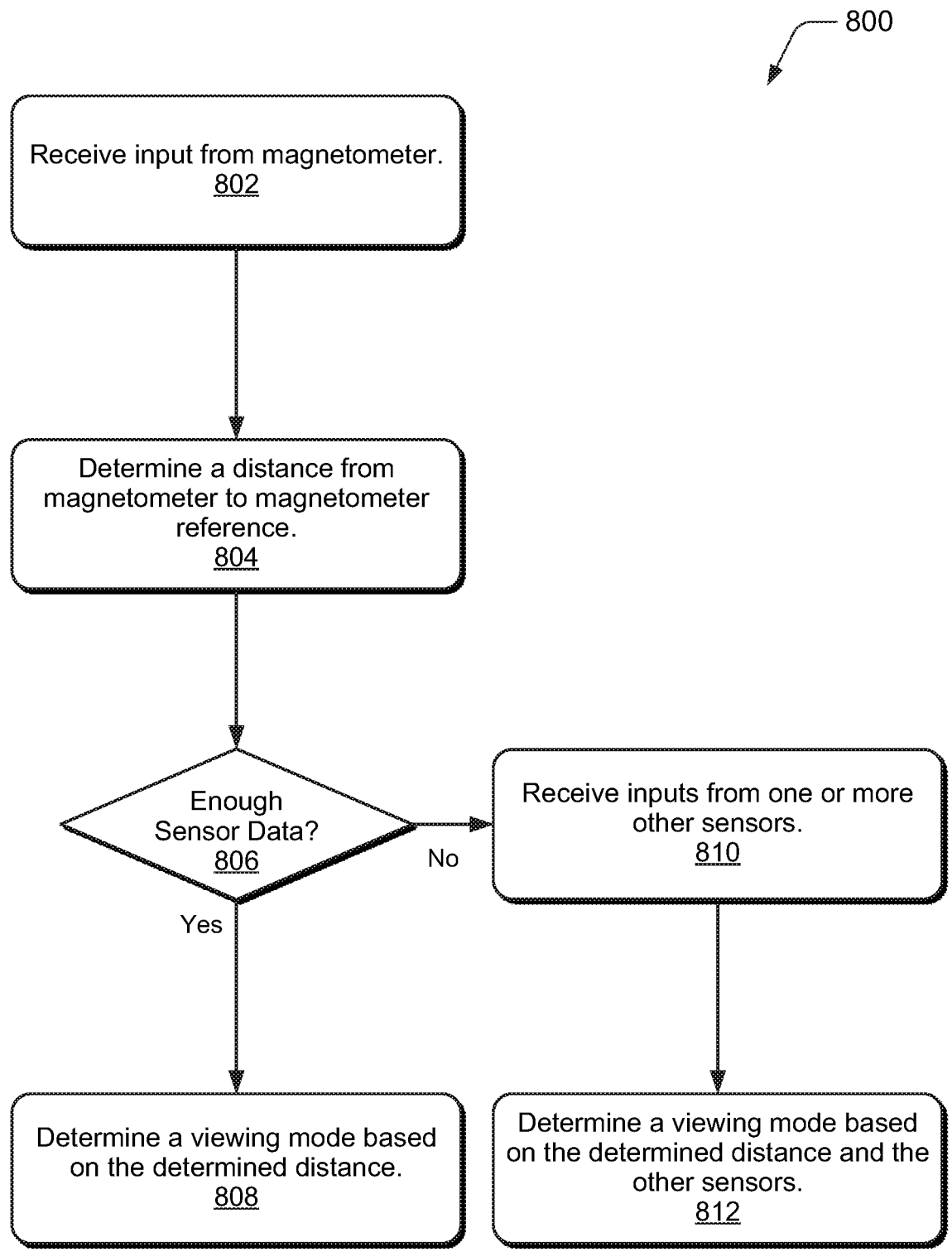
FIG. 8 illustrates a method of determining a viewing mode of the mobile device using a magnetometer and other sensors in accordance with one or more implementations.
Figure 9:
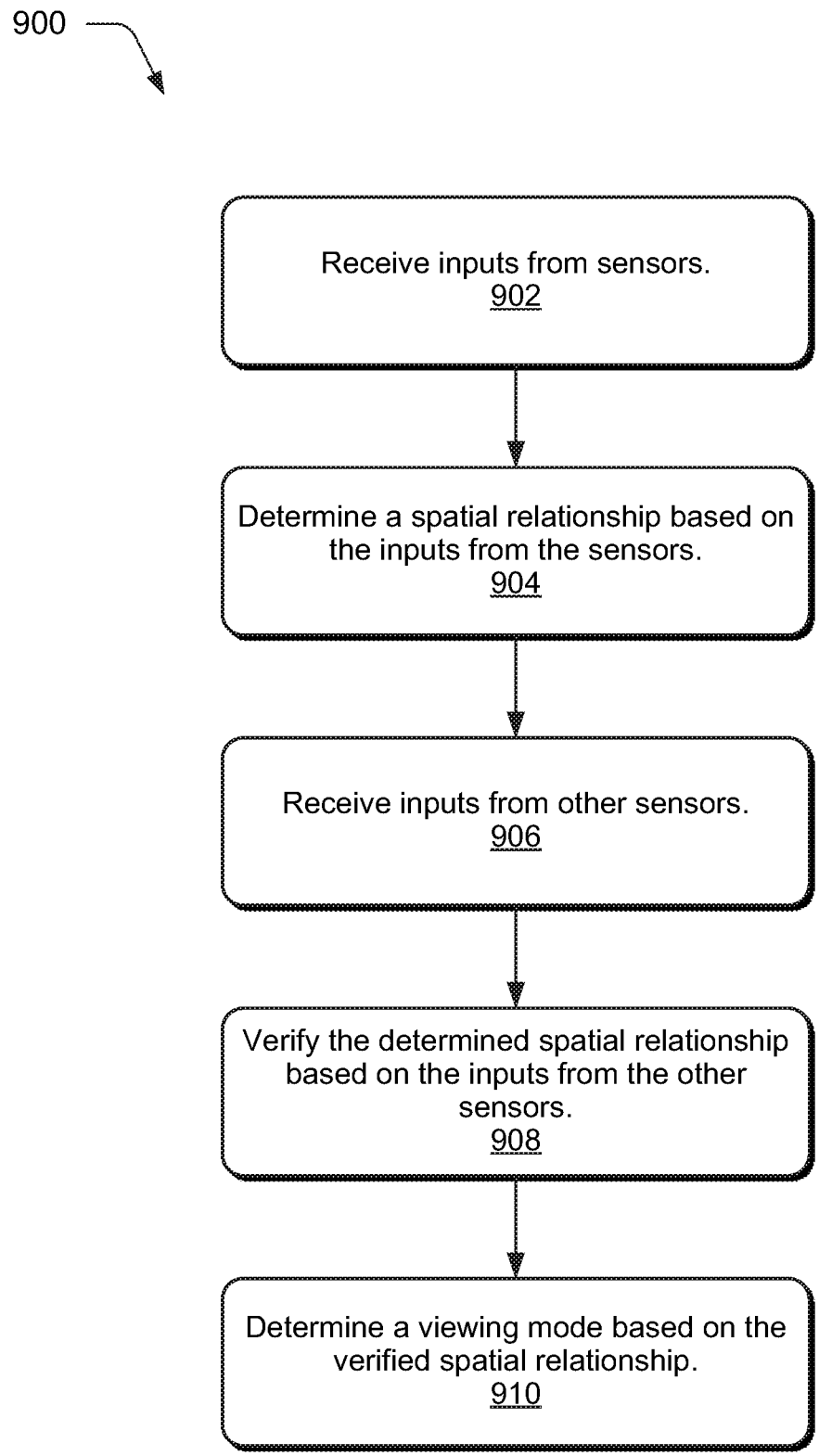
FIG. 9 illustrates a method of determining a viewing mode of the mobile device using one set of sensors to determine a viewing mode and another set of sensors to verify the viewing mode in accordance with one or more implementations.

FIGS. 7-9 illustrate example procedures for determining a viewing mode of the mobile device 100 using the sensors described above. Aspects of these methods may be implemented in hardware, firmware, software, or any combination thereof. The methods are shown as a set of blocks that specify operations performed by one or more devices, as illustrated and discussed with reference to FIG. 6. The operations are not necessarily limited to the orders shown for performing the operations by the respective blocks. Further, performance of these operations is not limited to the example system. Accordingly, the following discussion is arranged as including a description of the system and procedures in parallel.

FIG. 7 illustrates an example procedure 700 for determining a viewing mode of the viewing mode determination module 114 using accelerometers and other sensors. At block 702, the viewing mode determination module 114 receives inputs from the first accelerometer 126 and the second accelerometer 128 to gather absolute data with regards to the orientations in space of first housing 108 and the second housing 110.

At block 704, the viewing mode determination module 114 determines a relative angle between the first housing 108 and the second housing 110 based upon a relative angle calculation of the first x-axis 130 and the second x-axis 132 of the two respective accelerometers.

At decision block 706, the viewing mode determination module 114 determines whether a viewing mode determination can be made based on the relative angle calculation alone. For example, if the relative angle is zero or 90 degrees then the viewing mode determination module 114 has enough information to determine a viewing mode. If the viewing mode determination module 114 is able to determine a viewing mode then the process proceeds to block 708. If the viewing mode determination module 114 is unable to determine a viewing mode then the process proceeds to block 710.

At block 708, the viewing mode determination module 114 determines a viewing mode of the viewing mode determination module 114 based upon the angle calculation of block 704.

At block 710, the viewing mode determination module 114 receives inputs from one or more other sensors. These sensors may be one or more of the first IR sensors 134, the second IR sensors 136, the proximity sensor 138, the magnetometer 140, or the display device 104.

At block 712, the viewing mode determination module 114 utilizes the angle determination from block 704 along with the sensor inputs from block 710 to determine a viewing mode of the viewing mode determination module 114.

FIG. 8 illustrates an example procedure 800 for determining a viewing mode of the viewing mode determination module 114 using a magnetometer and other sensors. At block 802, the viewing mode determination module 114 receives inputs from the magnetometer 140 to gather absolute data with regards to feedback from the magnetometer reference 142.

At block 804, the viewing mode determination module 114 determines a relative distance between the magnetometer 140 and the magnetometer reference 142.

At decision block 806, the viewing mode determination module 114 determines whether a viewing mode determination can be made on the distance calculation alone. For example, if the distance is a maximum or a minimum then the viewing mode determination module 114 has enough information to determine a viewing mode. If the viewing mode determination module 114 is able to determine a viewing mode then the process proceeds to block 808. If the viewing mode determination module 114 is unable to determine a viewing mode then the process proceeds to block 810.

At block 808, the viewing mode determination module 114 determines a viewing mode of the viewing mode determination module 114 based upon the distance calculation of block 804.

At block 810, the viewing mode determination module 114 receives inputs from one or more other sensors. These sensors may be one or more of the first accelerometer 126, the second accelerometer 128, the first IR sensors 134, the second IR sensors 136, the proximity sensor 138, or the display device 104.

At block 812, the viewing mode determination module 114 utilizes the distance determination from block 804 along with the sensor inputs from block 810 to determine a viewing mode of the viewing mode determination module 114.

FIG. 9 illustrates an example procedure 900 for determining a viewing mode of the viewing mode determination module 114 using redundant sensors. At block 902, the viewing mode determination module 114 receives inputs from one or more sensors of the viewing mode determination module 114. These sensors may be one or more of the first accelerometer 126, the second accelerometer 128, the first IR sensors 134, the second IR sensors 136, the proximity sensor 138, the magnetometer 140, or the display device 104.

At block 904, the viewing mode determination module 114 determines a spatial relationship of a plurality of housings of the device 100 based on the inputs received from the one or more sensors.

At block 906, the viewing mode determination module 114 receives inputs from one or more other sensors of the viewing mode determination module 114. These sensors may be one or more of the first accelerometer 126, the second accelerometer 128, the first IR sensors 134, the second IR sensors 136, the proximity sensor 138, the magnetometer 140, or the display device 104 that were not used as inputs in block 902.

At block 908, the viewing mode determination module 114 verifies that the inputs from the one or more other sensors correlate with the determined spatial relationship of block 904. If the viewing mode determination module 114 cannot verify the determined spatial relationship, the procedure stops here.

At block 910, responsive to block 908 verifying the determined spatial relationship, the viewing mode determination module 114 determines a viewing mode of the viewing mode determination module 114.

Although implementations of determining spatial relationships between housings of a mobile device have been described in language specific to features and/or methods, the subject of the appended claims is not necessarily limited to the specific features or methods described. Rather, the specific features and steps are disclosed as example implementations of determining spatial relationships between housings of a mobile device.

Example Device

Figure 10:
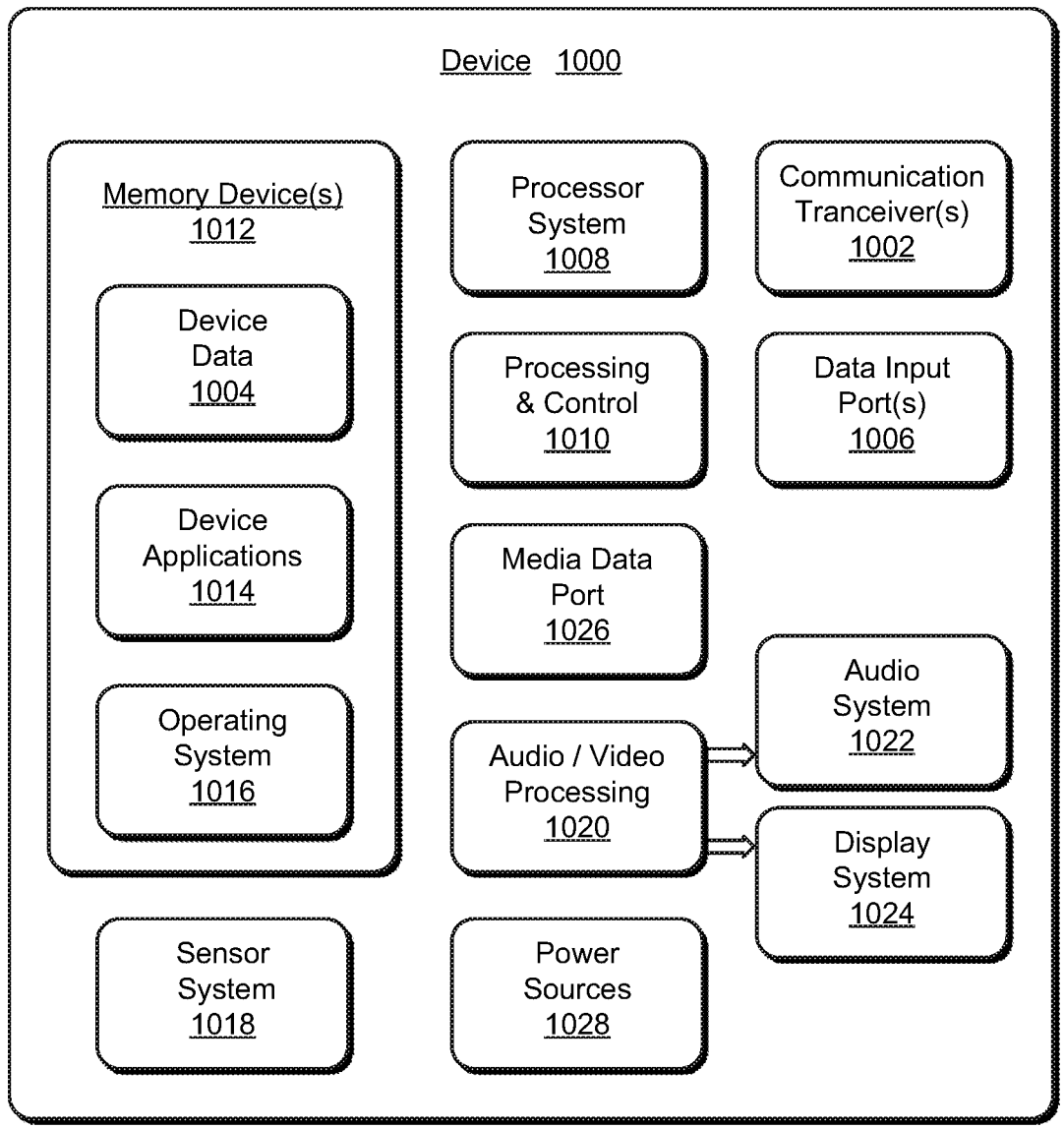
FIG. 10 illustrates an example device for determining spatial relationships between housings of a mobile device in accordance with one or more implementations.

FIG. 10 illustrates various components of an example device 1000 in which embodiments of determining spatial relationships between housings of a mobile device can be implemented. The example device 1000 can be implemented as any of the computing devices described with reference to FIGS. 1-4, such as any type of client device, mobile phone, tablet, computing, communication, entertainment, gaming, media playback, and/or other type of device. For example, the mobile device 100 shown in FIG. 1 may be implemented as the example device 1000.

The device 1000 includes communication transceivers 1002 that enable wired and/or wireless communication of device data 1004 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. In this example, the device 1000 includes a sensor system 1018 that implements embodiments of determining spatial relationships between housings of a mobile device, and may be implemented with hardware components and/or in software, such as when the device 1000 is implemented as the mobile device 100 described with reference to FIGS. 1-6. An example of the sensor system 1018 are the sensors 116 that are implemented by the mobile device 100.

The device 1000 also includes an audio and/or video processing system 1020 that generates audio data for an audio system 1022 and/or generates display data for a display system 1024. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1026. In implementations, the audio system and/or the display system are integrated components of the example device. Alternatively, the audio system and/or the display system are external, peripheral components to the example device.

The device 1000 can also include one or more power sources 1028, such as when the device is implemented as a mobile device. The power sources may include a charging and/or power system, and can be implemented as a flexible strip battery, a rechargeable battery, a charged super-capacitor, and/or any other type of active or passive power source.

Although embodiments of determining spatial relationships between housings of a mobile device have been described in language specific to features and/or methods, the subject of the appended claims is not necessarily limited to the specific features or methods described. Rather, the specific features and methods are disclosed as example implementations of determining spatial relationships between housings of a mobile device, and other equivalent features and methods are intended to be within the scope of the appended claims. Further, various different embodiments are described and it is to be appreciated that each described embodiment can be implemented independently or in connection with one or more other described embodiments.

What is claimed is:

1. A mobile device comprising:
a plurality of housings that are connected, one to another, using a flex structure that is bendable to permit the plurality of housings to rotate in relation to each other;
a first visually continuous display device disposed over the plurality of housings and the flex structure and configured to bend along with the flex structure;
first and second accelerometers that are disposed at opposing ends of the plurality of housings;
a second visually continuous display device disposed over one or more of the housings opposite the first visually continuous display device, wherein the second visually continuous display device is configured to receive input for interacting with the first visually continuous display device; and
a module implemented at least partially in hardware, the module configured to:
 determine a spatial relationship of the plurality of housings, the spatial relationship indicating that one of the plurality of housings and a second one of the plurality of housings are parallel, one to another, and that the first visually continuous display device is partially, but not completely occluded by a portion of the plurality of housings, based at least in part on inputs received from the first and second accelerometers,
 determine that additional information is needed to determine a viewing mode of the mobile device, the viewing mode of the mobile device based on a relative proportion of the first visually continuous display device that is not occluded by the portion of the plurality of housings;
 receive, responsive to determining the additional information is needed, the additional information from at least one other sensor, the additional information including the relative proportion of the first visually continuous display device that is not occluded by the portion of the plurality of housings,
 determine the viewing mode based on the spatial relationship and the additional information; and
 enable interaction with the relative proportion of the first visually continuous display device that is not occluded by the portion of the plurality of housings, via the second visually continuous display device.

2. The mobile device as described in claim 1, wherein the module is configured to determine the spatial relationship through comparison of angles detected by respective ones of the first and second accelerometers.

3. The mobile device as described in claim 1, wherein the module is further configured to identify an open mode based on the inputs received from the first and second accelerometers indicating the plurality of housings are disposed along a single plane.

4. The mobile device as described in claim 1, wherein the module is further configured to identify a dock mode based on the inputs received from the first and second accelerometers indicating the one of the plurality of housings and the second one of the plurality of housings are normal to each other.

5. The mobile device as described in claim 1, wherein the module is configured to identify a closed mode based on the additional information received from the at least one other sensor indicating an edge of the one of the plurality of housings is flush with another edge of the second one of the plurality of housings.

6. The mobile device as described in claim 1, wherein the module is configured to identify a glance mode based on the additional information received from the at least one other sensor indicating an edge of the one of the plurality of housings is offset with respect to another edge of the second one of the plurality of housings effective to expose the relative proportion of the first visually continuous display device that is not occluded by the portion of the plurality of housings.

7. The mobile device as described in claim 1, wherein the module is configured to identify a productive mode based on the additional information received from the at least one other sensor indicating an edge of the one of the plurality of housings is offset with respect to another edge of the second one of the plurality of housings effective to expose the relative proportion of the first visually continuous display device that is not occluded by the portion of the plurality of housings, wherein the relative proportion is half of the first visually continuous display device.

8. The mobile device as described in claim 1:
wherein the module is configured to identify a glance or productive mode based on the additional information received from the at least one other sensor indicating an edge of the one of the plurality of housings is offset with respect to another edge of the second one of the plurality of housings effective to expose the relative proportion of the first visually continuous display device that is not occluded by the portion of the plurality of housings.

9. The mobile device as described in claim 1, wherein the module is configured to verify a spatial relationship of the plurality of housings in relation to each other based at least in part on the additional information received from the at least one other sensor.

10. The mobile device as described in claim 1, wherein the at least one other sensor is configured as a proximity sensor, infrared sensor, touch input sensor, or magnetometer.

11. The mobile device as described in claim 1, wherein the flex structure is formed as part of the plurality of housings such that the plurality of housings are bendable at a plurality of different locations to permit the rotation.

12. A mobile device comprising:
a plurality of housings that are connected, one to another, using a flex structure that is bendable to permit the plurality of housings to rotate in relation to each other;
a first visually continuous display device disposed over the plurality of housings and the flex structure and configured to bend along with the flex structure;
a magnetometer and a magnetometer reference that are disposed at opposing ends of the plurality of housings;
a second visually continuous display device disposed over one or more of the housings opposite the first visually continuous display device, wherein the second visually continuous display device is configured to receive input for interacting with the first visually continuous display device; and
a module implemented at least partially in hardware, the module configured to:
determine a spatial relationship of the plurality of housings, the spatial relationship indicating that one of the plurality of housings and a second one of the plurality of housings are parallel, one to another, and that the first visually continuous display device is partially, but not completely, occluded by a portion of the plurality of housings, based at least in part on inputs received from the magnetometer,
determine that additional information is needed to determine a viewing mode of the mobile device based on the inputs received from the magnetometer indicating that the magnetometer is a middle distance from the magnetometer reference,
receive, responsive to determining the additional information is needed, the additional information from at least one other sensor, the additional information including a relative proportion of the first visually continuous display device that is not occluded by the portion of the plurality of housings,
determine the viewing mode based on the spatial relationship and the additional information; and
enable interaction with the relative proportion of the first visually continuous display device that is not occluded by the portion of the plurality of housings, via the second visually continuous display device.

13. The mobile device as described in claim 12, wherein the module is configured to determine the spatial relationship through a feedback reading of the magnetometer reference detected by the magnetometer.

14. The mobile device as described in claim 12, wherein the module is further configured to identify an open mode based on the inputs received from the magnetometer indicating the plurality of housings are disposed along a single plane.

15. The mobile device as described in claim 12, wherein the module is further configured to identify a closed mode based on the inputs received from the magnetometer indicating a one of the plurality of housings and a second one of the plurality of housings are parallel to each other and that an edge of the one of the plurality of housings is flush with another edge of the second one of the plurality of housings.

16. The mobile device as described in claim 12, wherein the module is configured to identify the viewing mode as a glance mode or a productive mode based on a combination of the additional information received from the at least one other sensor and the inputs received from the magnetometer, the glace mode or the productive mode not determinable by the inputs received from the magnetometer alone.

17. The mobile device as described in claim 12, wherein the at least one other sensor is configured as a proximity sensor, infrared sensor, touch input sensor, or accelerometer.

18. A mobile device comprising:
a plurality of housings that are connected, one to another, using a flex structure that is bendable to permit the plurality of housings to rotate in relation to each other;

a first visually continuous display device disposed over the plurality of housings and the flex structure and configured to bend along with the flex structure;

a plurality of sensors;

a second visually continuous display device disposed over one or more of the housings opposite the first visually continuous display device, wherein the second visually continuous display device is configured to receive input for interacting with the first visually continuous display device; and a module implemented at least partially in hardware, the module configured to:

determine a spatial relationship of the plurality of housings, the spatial relationship indicating that one of the plurality of housings and a second one of the plurality of housings are parallel, one to another, and that the first visually continuous display device is partially, but not completely, occluded by a portion of the plurality of housings, based on inputs received from at least one sensor of the plurality of sensors;

receive additional inputs from at least one other sensor of the plurality of sensors responsive to the spatial relationship indicating at least two of the plurality of housings are parallel to one another and that the first visually continuous display device is partially, but not completely, occluded by the portion of the plurality of housings;

determine a relative proportion of the first visually continuous display device that is not occluded by the portion of the plurality of housings, based on the additional inputs;

determine a mode of the mobile device based on the spatial relationship, and the relative proportion of the first visually continuous display device that is not occluded by the portion of the plurality of housings;

select a display mode for the first visually continuous display device based upon the determined mode; and enable interaction with the relative proportion of the first visually continuous display device that is not occluded by the portion of the plurality of housings, via the second visually continuous display device.

19. The mobile device as described in claim 18, wherein the at least one sensor includes two accelerometers disposed at opposing ends of the plurality of housings and wherein the module is configured to determine the spatial relationship through comparison of angles detected by the two accelerometers.

20. The mobile device as described in claim 19, wherein the at least one other sensor is configured as a proximity sensor, infrared sensor, touch input sensor, or magnetometer.

* * * * *